(12) United States Patent
Itakura

(10) Patent No.: US 7,573,877 B2
(45) Date of Patent: Aug. 11, 2009

(54) TERMINAL APPARATUS, DATA TRANSMITTING APPARATUS, DATA TRANSMITTING AND RECEIVING SYSTEM, AND DATA TRANSMITTING AND RECEIVING METHOD

(75) Inventor: Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1161 days.

(21) Appl. No.: 10/414,947

(22) Filed: Apr. 16, 2003

(65) Prior Publication Data

US 2004/0004959 A1 Jan. 8, 2004

(30) Foreign Application Priority Data

Apr. 17, 2002 (JP) ............... 2002-115348

(51) Int. Cl.
H04L 12/28 (2006.01)
H04L 12/56 (2006.01)
H04J 3/16 (2006.01)
H04J 3/22 (2006.01)

(52) U.S. Cl. ............. 370/392; 370/395.21; 370/395.43; 370/468

(58) Field of Classification Search ................. 370/389, 370/395.21, 395.41, 395.42, 395.43, 468
See application file for complete search history.

(56) References Cited

U.S. PATENT DOCUMENTS

| | | | |
|---|---|---|---|
| 5,532,744 A * | 7/1996 | Akiwumi-Assani et al. ...... | 348/390.1 |
| 5,896,530 A * | 4/1999 | White ......................... | 718/102 |
| 6,317,131 B2 * | 11/2001 | Basso et al. .................. | 345/474 |
| 6,907,070 B2 * | 6/2005 | Wu et al. ................ | 375/240.12 |
| 7,031,718 B2 * | 4/2006 | Jouppi et al. ................. | 455/450 |
| 7,031,965 B1 * | 4/2006 | Moriya et al. ................. | 707/10 |
| 2002/0001298 A1 * | 1/2002 | Tourunen et al. ............ | 370/349 |
| 2002/0138649 A1 * | 9/2002 | Cartmell et al. ............. | 709/245 |

FOREIGN PATENT DOCUMENTS

| | | |
|---|---|---|
| JP | 07-123132 | 5/1995 |
| JP | 09-298749 | 11/1997 |
| JP | EP000939545 A2 * | 2/1999 |
| JP | 2001-358799 | 12/2001 |
| JP | 2002-108757 | 12/2002 |

OTHER PUBLICATIONS

Office Action in JP 2002-1153448 (2 pages).
Office Action from JP 2002-115348, mailed Oct. 10, 2007 (2 pages).

* cited by examiner

*Primary Examiner*—Ronald Abelson
(74) *Attorney, Agent, or Firm*—Finnegan, Henderson, Farabow, Garrett & Dunner, L.L.P.

(57) ABSTRACT

A terminal apparatus transmits a data requesting packet requesting transmission of desired data and having information indicating capability of the terminal apparatus attached thereto to a data transmitting apparatus. The data transmitting apparatus receives the data requesting packet, detects the information indicating the capability of the terminal apparatus from the data requesting packet received, receives information on a state of a network, the information being transmitted from a network monitoring apparatus, and transmits data based on the detected information indicating the capability of the terminal apparatus and the received information on the state of the network to the terminal apparatus via the network. The terminal apparatus receives the data transmitted from the data transmitting apparatus, decodes the received data, and outputs the decoded data.

22 Claims, 6 Drawing Sheets

FIG. 3

PROFILE EXAMPLE 1 (SPATIAL RESOLUTION)

| 0 | QCIF (176 × 144) |
|---|---|
| 1 | CIF (352 × 288) |
| 2 | SD (720 × 576) |
| 3 | HDTV (1920 × 1080) |

FIG. 4

PROFILE EXAMPLE 2 (SNR:Signal-to-Noise Ratio)

| 4 | IMAGE QUALITY LEVEL (VHS EXTENDED PLAY (EP) MODE LEVEL) |
|---|---|
| 5 | IMAGE QUALITY LEVEL (VHS STANDARD PLAY LEVEL) |
| 6 | IMAGE QUALITY LEVEL (DVD LEVEL) |
| 7 | IMAGE QUALITY LEVEL (HDTV) |

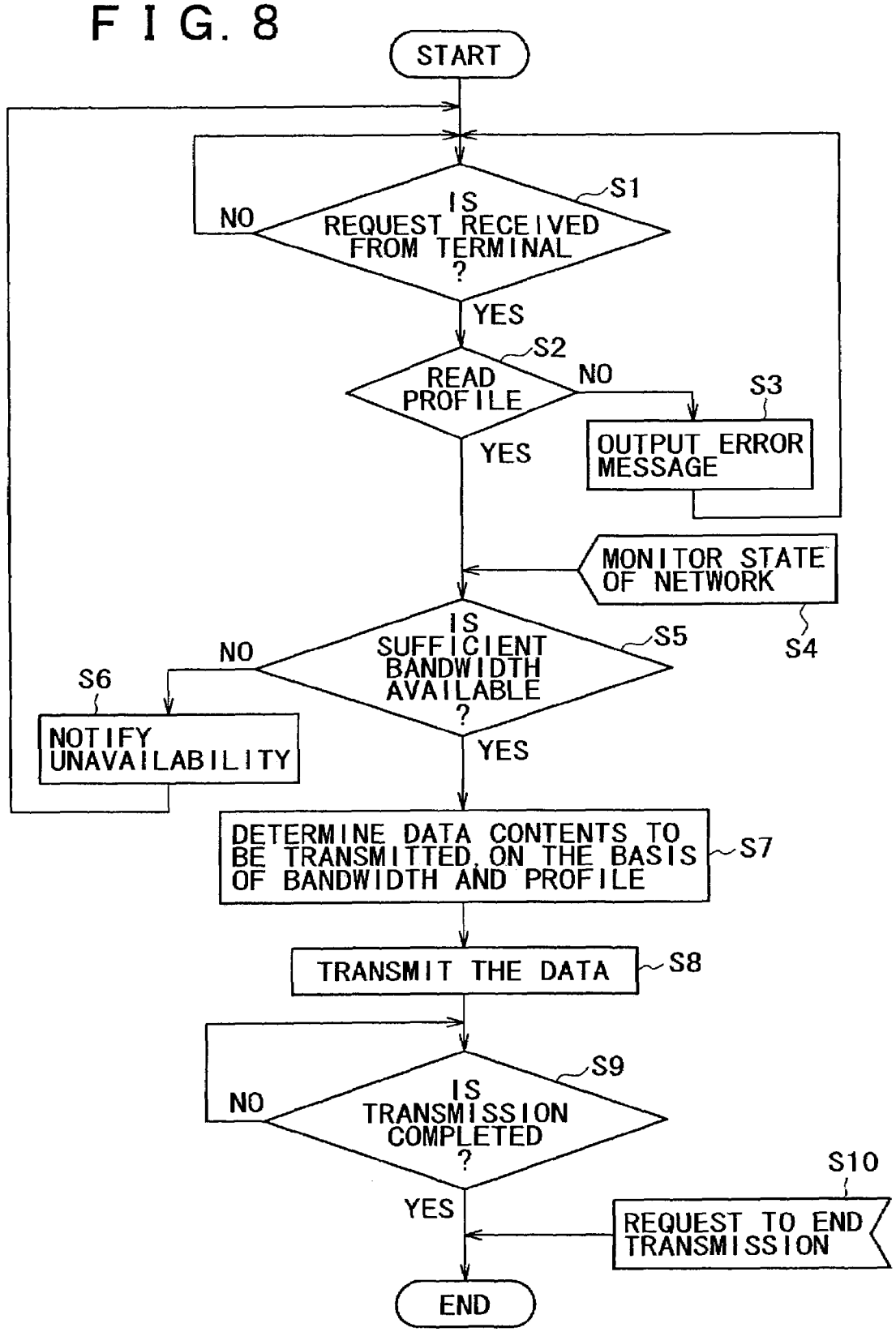

TERMINAL APPARATUS, DATA TRANSMITTING APPARATUS, DATA TRANSMITTING AND RECEIVING SYSTEM, AND DATA TRANSMITTING AND RECEIVING METHOD

BACKGROUND OF THE INVENTION

The present invention relates to data transmission via a network, and particularly to a terminal apparatus, a data transmitting apparatus, a data transmitting and receiving system, and a data transmitting and receiving method for controlling transmitted data according to capability of the terminal apparatus.

In contents distribution by video-on-demand service, distribution of live video, or real-time communication such as videoconferencing, the videophone and the like, a system is devised which transmits data appropriate for capacity of terminal apparatus having different performances which data is obtained from the same source data to the terminal apparatus, using a layered coding (scalable coding) technique.

Conventionally, a server apparatus or the like on a data transmitting side is required to prepare a data file in a different format according to capability of a terminal apparatus to which to transmit data or prepare a different data file according to a transmission rate.

However, the use of the layered coding technique enables data from a single data file to be distributed simultaneously to terminal apparatus having different performances, for example a terminal apparatus having a display with a low resolution and a CPU (Central Processing Unit) with a low processing capability, such as a portable telephone or the like, and a terminal apparatus having a monitor with a high resolution and a CPU with a high processing capability, such as a desktop personal computer or the like.

For such data transmission according to the capability of the terminal apparatus, information indicating the capability of the terminal apparatus needs to be notified in advance to a server apparatus or the like serving as a data transmitting apparatus, and a complicated negotiation or the like is required between the terminal apparatus and the server apparatus.

In the case of a terminal apparatus such as a PC (Personal Computer) having various advanced functions and including an OS (Operating System) with a high processing capability, for example, it is easy to implement a protocol for notifying the information indicating the capability of the terminal apparatus and performing the negotiation with the server apparatus as described above.

Recently, however, an IP (Internet Protocol) address is given even to a portable telephone whose data processing capability is not very high and whose memory included therein is limited in capacity and the like and to a household electrical appliance that does not include even an OS. It is very difficult for the household electrical appliance and the portable telephone having a network connecting function but a relatively low data processing capability to implement an advanced protocol as in the case of the PC to perform a negotiation in communication.

Hence, data appropriate for the capability of the terminal apparatus having a network connecting function but a relatively low data processing capability cannot be delivered to the terminal apparatus.

SUMMARY OF THE INVENTION

Accordingly, the present invention has been devised to solve problems as described above, and it is an object of the present invention to provide a terminal apparatus, a data transmitting apparatus, a data transmitting and receiving system, and a data transmitting and receiving method that make it possible to notify the capability of the terminal apparatus and deliver data appropriate to the capability of the terminal apparatus even when the terminal apparatus does not have an advanced negotiation function.

In order to achieve the above object, according to the present invention, there is provided a terminal apparatus connected to a data transmitting apparatus for transmitting data via a network, the terminal apparatus including: packet transmitting means for transmitting a data requesting packet requesting transmission of desired data and having information indicating capability of the terminal apparatus attached thereto to the data transmitting apparatus; data receiving means for receiving the desired data that is transmitted from the data transmitting apparatus in response to reception of the data requesting packet; decoding processing means for decoding the data received by the data receiving means; and output means for outputting the data decoded by the decoding processing means.

Further, in order to achieve the above object, according to the present invention, there is provided a data transmitting apparatus connected to a terminal apparatus via a network, the data transmitting apparatus including: packet receiving means for receiving a data requesting packet requesting transmission of data, the data requesting packet being transmitted from the terminal apparatus; detecting means for detecting information indicating capability of the terminal apparatus, the information being attached to the data requesting packet received by the packet receiving means; network state information receiving means for receiving information on a state of the network, the information being transmitted from a network monitoring apparatus for monitoring the state of the network; and data transmitting means for transmitting, via the network, data based on the information indicating the capability of the terminal apparatus detected by the detecting means and the information on the state of the network received by the network state information receiving means.

Further, in order to achieve the above object, according to the present invention, there is provided a data transmitting and receiving system including: a terminal apparatus; a data transmitting apparatus; and a network monitoring apparatus for monitoring a state of a network, the terminal apparatus, the data transmitting apparatus, and the network monitoring apparatus being connected to each other via the network; wherein the terminal apparatus includes: packet transmitting means for transmitting a data requesting packet requesting transmission of desired data and having information indicating capability of the terminal apparatus attached thereto to the data transmitting apparatus; data receiving means for receiving the desired data that is transmitted from the data transmitting apparatus in response to reception of the data requesting packet; decoding processing means for decoding the data received by the data receiving means; and output means for outputting the data decoded by the decoding processing means; and the data transmitting apparatus includes: packet receiving means for receiving the data requesting packet having the information indicating the capability of the terminal apparatus attached thereto, the data requesting packet being transmitted from the terminal apparatus; detecting means for detecting the information indicating the capability of the terminal apparatus from the data requesting packet received by the packet receiving means; network state information receiving means for receiving information on the state of the network, the information being transmitted from the network monitoring apparatus; and data transmitting means for transmitting, via the network, data based on the information indicating the capability of the terminal apparatus detected by the detecting means and data of the information on the state of the network received by the network state information receiving means.

Further, in order to achieve the above object, according to the present invention, there is provided a data transmitting and receiving method of a data transmitting and receiving system, the data transmitting and receiving system including: a terminal apparatus; a data transmitting apparatus; and a network monitoring apparatus for monitoring a state of a network, the terminal apparatus, the data transmitting apparatus, and the network monitoring apparatus being connected to each other via the network, the data transmitting and receiving method including the steps of: the terminal apparatus transmitting a data requesting packet requesting transmission of desired data and having information indicating capability of the terminal apparatus attached thereto to the data transmitting apparatus; the data transmitting apparatus receiving the data requesting packet transmitted from the terminal apparatus; detecting the information indicating the capability of the terminal apparatus from the data requesting packet received; receiving information on the state of the network, the information being transmitted from the network monitoring apparatus; and transmitting data based on the detected information indicating the capability of the terminal apparatus and the received information on the state of the network to the terminal apparatus via the network; and the terminal apparatus receiving the desired data transmitted from the data transmitting apparatus; decoding the received data; and outputting the decoded data.

As is clear from the above description, the terminal apparatus according to the present invention attaches information indicating capability of the terminal apparatus to a data requesting packet requesting transmission of desired data, and then transmits the data requesting packet to the data transmitting apparatus. Thereby the terminal apparatus can notify the capability of the terminal apparatus. It is thus possible to perform data communication according to the capability of the terminal apparatus without a complex protocol or a negotiation step.

Therefore, even when the terminal apparatus has a minimum capability (a CPU, a memory, and the like), the terminal apparatus with only transmitting and receiving means can receive data appropriate for the terminal apparatus from the data transmitting apparatus.

Also, as is clear from the above description, the data transmitting apparatus according to the present invention receives a data requesting packet transmitted from the terminal apparatus, the data requesting packet requesting transmission of desired data and having information indicating capability of the terminal apparatus attached thereto. Thereby the data transmitting apparatus can be informed of the capability of the terminal apparatus. It is thus possible to perform data communication according to the capability of the terminal apparatus without a complex protocol or a negotiation step.

Therefore, the data transmitting apparatus can transmit data appropriate for the terminal apparatus having a minimum capability (a CPU, a memory, and the like) in addition to the transmitting and receiving means.

Furthermore, the data transmitting apparatus can grasp a state of the network through the network monitoring apparatus. The data transmitting apparatus can therefore transmit the data to the terminal apparatus upon consideration of a state of congestion of the network and the like.

Further, as is clear from the above description, in the data transmitting and receiving system according to the present invention, the terminal apparatus attaches information indicating capability of the terminal apparatus to a data requesting packet requesting transmission of desired data, and then transmits the data requesting packet to the data transmitting apparatus. Thereby the terminal apparatus can notify the capability of the terminal apparatus to the data transmitting apparatus. It is thus possible to perform data communication according to the capability of the terminal apparatus without a complex protocol or a negotiation step.

Therefore, even when the terminal apparatus has only transmitting and receiving means and a minimum capability (a CPU, a memory, and the like), the data transmitting and receiving system according to the present invention can transmit data appropriate for the terminal apparatus from the data transmitting apparatus.

Furthermore, the data transmitting apparatus can grasp a state of the network through the network monitoring apparatus. The data transmitting apparatus can therefore transmit the data to the terminal apparatus in consideration of a state of congestion of the network and the like.

Further, as is clear from the above description, in the data transmitting and receiving method according to the present invention, the terminal apparatus attaches information indicating capability of the terminal apparatus to a data requesting packet requesting transmission of desired data, and then transmits the data requesting packet to the data transmitting apparatus. Thereby the terminal apparatus can notify the capability of the terminal apparatus to the data delivering apparatus. It is thus possible to perform data communication according to the capability of the terminal apparatus without a complex protocol or a negotiation step.

Therefore, even when the terminal apparatus has only transmitting and receiving means and a minimum capability (a CPU, a memory, and the like), the data transmitting and receiving method according to the present invention can transmit data appropriate for the terminal apparatus from the data transmitting apparatus.

Furthermore, the data transmitting apparatus can grasp a state of the network through the network monitoring apparatus. The data transmitting apparatus can therefore transmit the data to the terminal apparatus in consideration of a state of congestion of the network and the like.

BRIEF DESCRIPTION OF THE DRAWINGS

These and other objects of the invention will be seen by reference to the description, taken in connection with the accompanying drawing, in which:

FIG. 3 is a diagram showing an example of a profile of image data transmitted to the terminal apparatus in the data transmitting and receiving system;

FIG. 4 is a diagram showing an example of a profile of image data transmitted to the terminal apparatus in the data transmitting and receiving system;

FIG. 8 is a flowchart of assistance in explaining operation of a data transmitting apparatus in the data transmitting and receiving system.

DETAILED DESCRIPTION OF PREFERRED EMBODIMENTS

Preferred embodiments of a terminal apparatus, a data transmitting apparatus, a data transmitting and receiving system, and a data transmitting and receiving method according to the present invention will hereinafter be described in detail with reference to the drawings.

Figure 1:
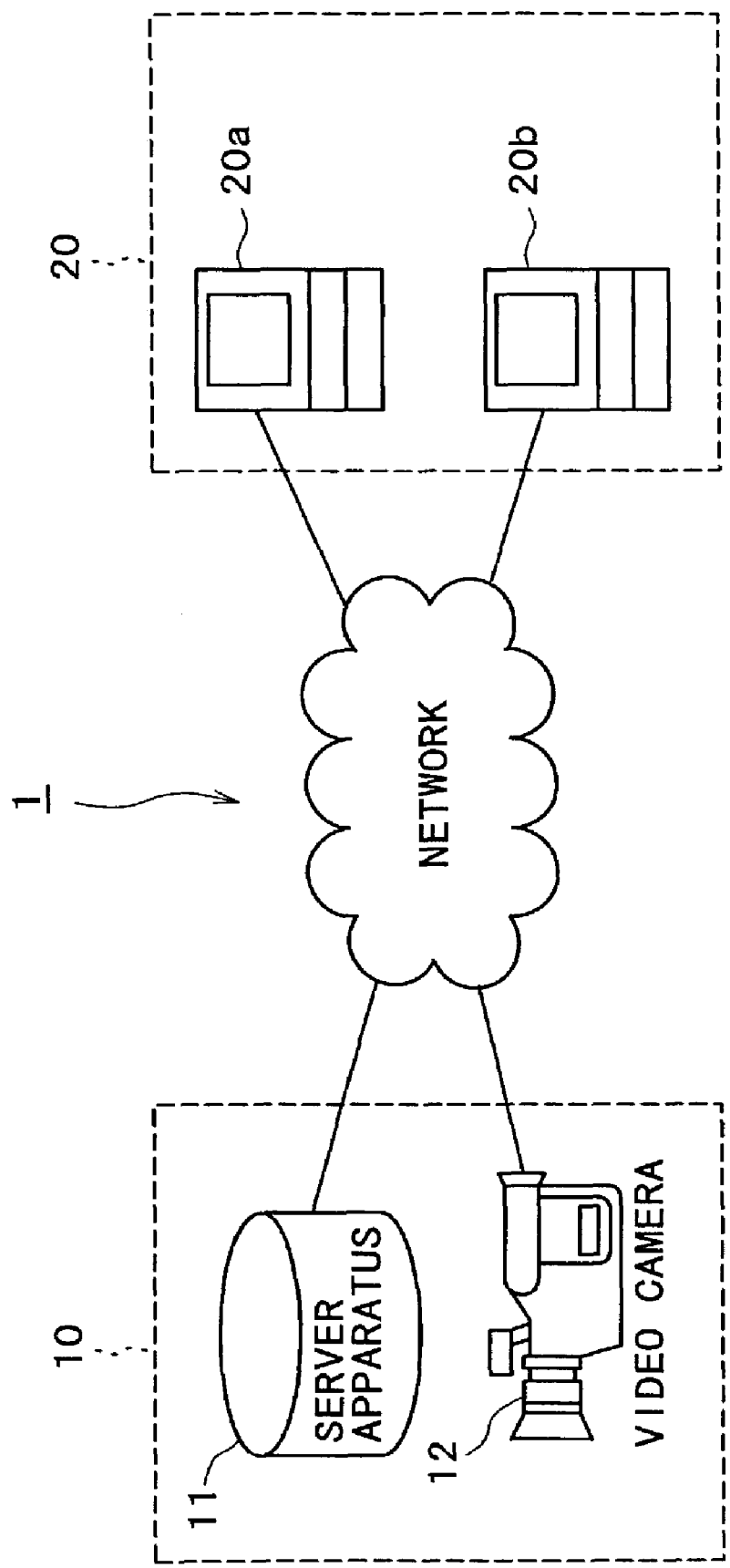
FIG. 1 is a diagram of assistance in explaining a configuration of a data transmitting and receiving system according to an embodiment of the present invention.

The present invention is applied to a data transmitting and receiving system 1 shown in FIG. 1. The data transmitting and receiving system 1 has a data transmitting apparatus 10 and a terminal apparatus 20 connected to each other via a network.

The network of the data transmitting and receiving system 1 is also connected with a network monitoring apparatus not shown in the figure for monitoring a state of congestion of the network and the like. A result of monitoring by the network monitoring apparatus is transmitted to the data transmitting apparatus 10 via the network regularly or in response to a request from the data transmitting apparatus 10.

The data transmitting apparatus 10 is a server apparatus 11 or a video camera 12, for example, and is an apparatus that has a function of distributing data such as contents to the terminal apparatus 20 via the network.

The server apparatus 11 stores a plurality of contents having image data compression-coded by a predetermined data compression method for transmission to the terminal apparatus 20, and is able to transmit the contents stored therein in response to a request from the terminal apparatus 20.

The video camera 12 takes a picture of a subject and generates image data by compression coding by a predetermined data compression method. The video camera 12 can record the generated image data onto a predetermined recording medium or transmit the image data to the terminal apparatus 20 via the network in real time.

The data transmitting apparatus 10 such as the server apparatus 11, the video camera 12 or the like retains or generates image data that is compression-coded by a data compression method adopting a layered coding method.

Examples of the data compression method adopting the layered coding method include MPEG2 (Moving Picture Experts Group Phase 2), MPEG4 (Moving Picture Experts Group Phase 4), JPEG (Joint Photographic Coding Experts Group) 2000, Motion JPEG2000, and the like.

The layered coding method is generally a compression coding method that generates, as one coded data file, a base layer, or coded data that can be decoded by even a low-speed and low-capability terminal apparatus 20 to restore an appropriate image, and an enhancement layer, or coded data added to the coded data of the base layer so that a high-speed and high-capability terminal apparatus 20 can restore an image of high resolution.

MPEG is a moving picture compression method using DCT (Discrete Cosine Transform). MPEG2 provides spatial scalability, SNR (Signal to Noise Ratio) scalability, and temporal scalability as parameters allowing layering. With each of the parameters, the base layer and the enhancement layer are defined.

Spatial scalability is a function assumed to be applied to connection between video standards with different spatial resolutions (numbers of pixels), for example HDTV (High Definition TeleVision) and SDTV (Standard Definition TeleVision).

With SNR scalability, there are a base layer where DCT coefficients quantized roughly using a relatively large quantization scale factor are coded, and an enhancement layer where differential DCT coefficients obtained by finely quantizing differences between the roughly quantized DCT coefficients and real DCT coefficients using a relatively small quantization scale factor are coded. With SNR scalability, two pieces of image data having different image qualities can be readily encoded and decoded.

With temporal scalability, when image data having different frame rates is mixed, an image having a low frame rate is coded in a base layer, and a frame of image data having a high frame rate, which frame cannot be represented at the low frame rate, is coded in an enhancement layer.

MPEG4 is a moving picture compression standard intended for coding at a very low bit rate of a few ten kbps (bits per second). Since MPEG4 provides higher resistance to errors and can deal with a lower communication speed than MPEG2, MPEG4 is a standard that can deal with radio communication of portable terminal apparatus and the like.

Further, since the compression coding method of MPEG4 allows coding on a per-object basis, scalability can be provided for each object. In addition, spatial scalability and temporal scalability can be provided for each object.

Further, MPEG4 is expected to incorporate a Fine Granularity (small step) Scalability technique into the standard. This technique enables image data from a low bit rate to a high bit rate to be distributed scalably.

JPEG2000 employs an image compression method using wavelet transformation, and provides a plurality of pieces of hierarchical image data of different resolutions, such as low resolution, standard resolution, and high resolution, by dividing the image data into frequency components and performing encoding.

With Motion JPEG2000, it is possible to handle moving images and distribute data scalably by packetizing into a layered structure.

The data transmitting apparatus 10 receives a data requesting packet requesting transmission of image data which packet is transmitted from the terminal apparatus 20, and then detects information indicating capability of the terminal apparatus which information is attached to a predetermined part of the received data requesting packet.

The data transmitting apparatus 10 also receives a result of monitoring of the network transmitted from the network monitoring apparatus not shown in the figure connected to the network. The network monitoring apparatus detects a state of congestion of the network and the like. The network monitoring apparatus notifies the data transmitting apparatus 10 of the state of congestion of the network and the like regularly or in response to a request from the data transmitting apparatus 10.

The data transmitting apparatus 10 determines a hierarchical level, a bit rate, a frame rate, resolution, a coding/decoding method, color depth (number of bits) and the like of the image data to be transmitted to the terminal apparatus 20 on the basis of the information indicating the capability of the terminal apparatus 20 which information is sent from the terminal apparatus 20 and the result of monitoring of the network transmitted from the network monitoring apparatus not shown in the figure.

Thus, the data transmitting apparatus 10 transmits the determined image data to the terminal apparatus 20 via the network. The data transmitting apparatus 10 transmits the image data determined in consideration of the capability of the terminal apparatus 20 and the state of the network to the terminal apparatus 20 via the network.

The terminal apparatus 20 is a PC (Personal Computer) or a portable telephone, for example. The terminal apparatus 20 transmits a data requesting packet requesting delivery of desired data to the data delivering apparatus 10 such as the server apparatus 11, the video camera 12, or the like as mentioned above via the network, and receives the image data transmitted in response to the data requesting packet via the network.

A terminal apparatus 20a and a terminal apparatus 20b, for example, are different in capabilities such as image display capability of the display, data processing capability of the CPU, and the like.

The data requesting packet is an IP (Internet Protocol) packet. The information indicating the capabilities of the terminal apparatus 20 itself can be attached to a header portion of the IP packet.

The capabilities of the terminal apparatus 20 are for example a bit rate and a frame rate at which the terminal apparatus 20 can perform processing, resolution of the display of the terminal apparatus 20, a data coding/decoding method that can be carried out, processing capability of the CPU of the terminal apparatus 20, color depth (number of bits) that can be represented, and the like.

The terminal apparatus 20 attaches the information indicating the capabilities of the terminal apparatus 20 to the header portion of the IP packet as follows.

Figure 2:
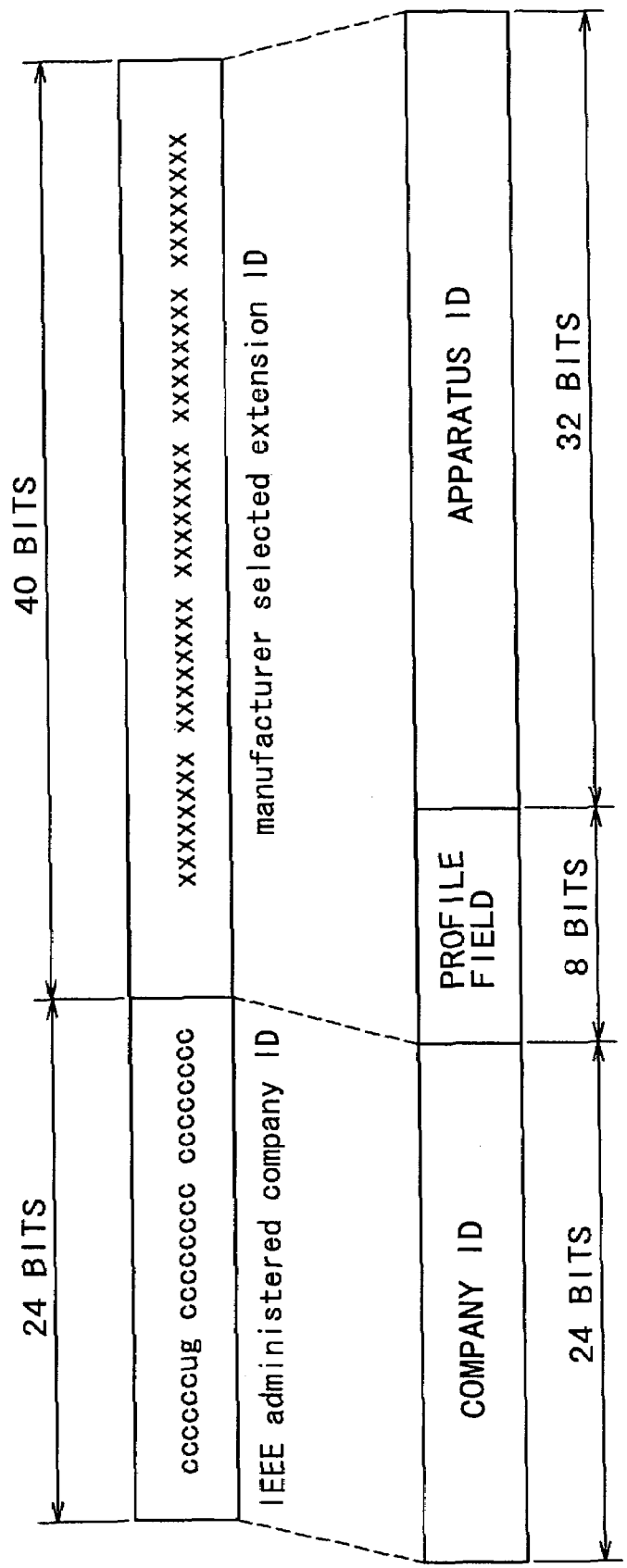
FIG. 2 is a diagram of assistance in explaining a profile field for describing information indicating capability of a terminal apparatus when IPv6 (Internet Protocol version 6) is applied as an IP protocol in the data transmitting and receiving system.

In a case where an IP address of the IP packet is an IPv6 (Internet Protocol version 6) address, for example, the information indicating the capability of the terminal apparatus 20 is described in an EUI (Extended Unique Identification)-64 field as shown in FIG. 2. EUI-64 is a standard defined by the IEEE (the Institute of Electrical and Electronics Engineers inc.). Information in this EUI-64 format is used in 64 lower-order bits of a 128-bit IP address of IPv6, the 64 lower-order bits being assigned as an interface ID.

EUI-64 includes a field of 24 bits describing a company ID and a field of 40 bits describing an apparatus ID. First eight bits of the apparatus ID of 40 bits is used as a field where data for describing the information indicating the capability of the terminal apparatus 20 is written.

In the description below, the field describing the information indicating the capability of the terminal apparatus 20 is referred to as a profile field, and the information indicating the capability of the terminal apparatus 20 is also referred to as a profile.

For example, the information indicating the capability of the terminal apparatus 20 may be described directly in the profile field, or when the data transmitting apparatus 10 retains a table that relates the information indicating the capability of the terminal apparatus 20 to an identifier for identifying the capability, the identifier may be described in the profile field.

Suppose for example that as in the latter case, the data transmitting apparatus 10 has a table for determining spatial resolution as shown in FIG. 3 as the table that relates the information indicating the capability of the terminal apparatus 20 to an identifier for identifying the capability.

In this case, when the terminal apparatus 20 describes an identifier "2," for example, in the profile field of a data requesting packet, the data transmitting apparatus 10 determines that the resolution of the terminal apparatus 20 is SD (Standard Definition: 720×576 resolution).

In order to change image quality level at the same spatial resolution, for example SD (720×576 resolution) the profile is classified according to the image quality level as shown in FIG. 4, and a desired image quality level is described in the profile field of the data requesting packet. Thereby the quality level of an image desired to be transmitted by the data transmitting apparatus 10 can be requested.

Figure 5:
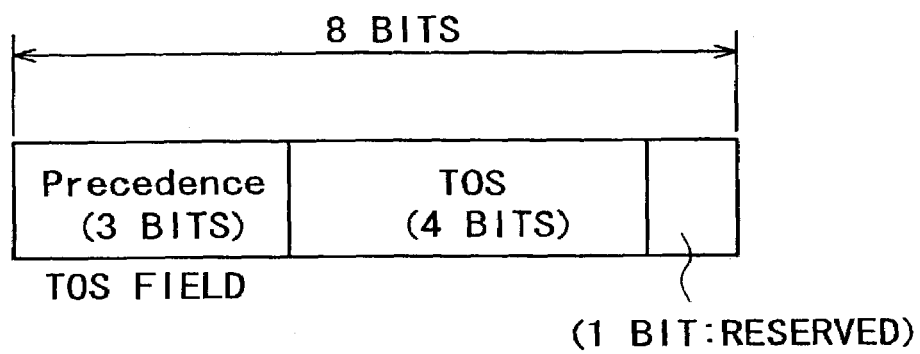
FIG. 5 is a diagram of assistance in explaining a TOS (Type of Service) field for describing information indicating capability of the terminal apparatus when IPv4 (Internet Protocol version 4) is applied as an IP protocol in the data transmitting and receiving system.

In a case where the IP address of a data requesting packet is an IPv4 (Internet Protocol version 4) address, the information indicating the capability of the terminal apparatus 20 is described in a TOS (Type of Service) field of an IPv4 header, as shown in FIG. 5.

The TOS field is provided to indicate a type of traffic (service) requested by an application layer of the OSI (Open System Interconnection) reference model, for example traffic allowing a substantial delay, traffic requiring real-time transmission or the like.

A profile is described in IPv4 using a Precedence field of the TOS field, for example. With the profiles described with reference to FIG. 3 and FIG. 4, an identifier of zero to seven is described in the Precedence field, whereby the data transmitting apparatus 10 can determine the profile of the terminal apparatus 20.

By thus using the TOS field of the IPv4 header, the terminal apparatus 20 can transmit the profile, or the information indicating the capability of the terminal apparatus, to the data transmitting apparatus 10.

Figure 6:
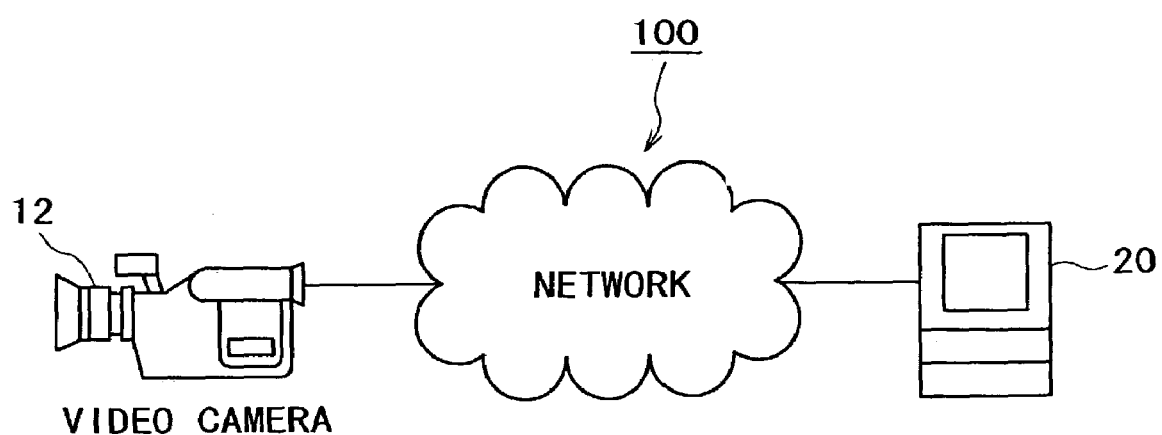
FIG. 6 is a diagram showing a second configuration of the data transmitting and receiving system.

The data transmitting and receiving system 1 shown in FIG. 1 may be for example a data transmitting and receiving system 100 as shown in FIG. 6, in which the data transmitting apparatus 10 such as the video camera 12 or the like and the terminal apparatus 20 are connected in a one-to-one relation to each other.

Figure 7:
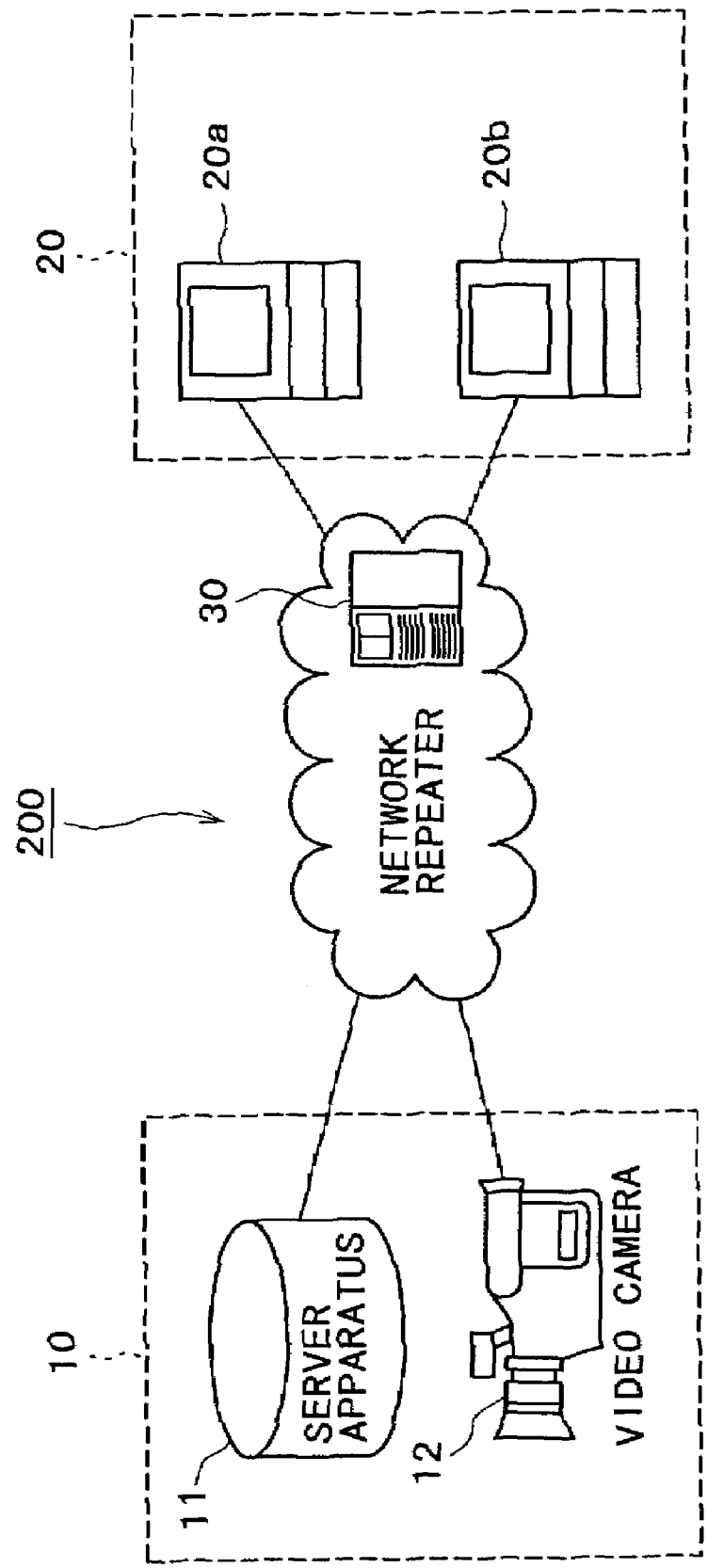
FIG. 7 is a diagram showing a third configuration of the data transmitting and receiving system.

Further, as shown in FIG. 7, the data transmitting and receiving system 1 may be configured as a data transmitting and receiving system 200 having a repeater 30 on a network.

The repeater 30 is a router or a multicast server, for example. The repeater 30 receives a data requesting packet transmitted from a terminal apparatus 20 in which packet the profile of the terminal apparatus is described, and thus reads the profile of each terminal apparatus 20. The repeater 30 transmits the read profile to a data transmitting apparatus 10 via a network. The data transmitting apparatus 10 determines data to be transmitted on the basis of the profile, and then transmits the data to the repeater 30.

The repeater 30 receives the data transmitted from the data transmitting apparatus 10, and then multicasts the received data to the terminal apparatus 20 via the network.

Incidentally, when the terminal apparatus 20 is present on the network and the repeater 30 receives many profiles, data of all layers may be transmitted to the repeater 30.

Operation of the data transmitting apparatus 10 such as the server apparatus 11, the video camera 12, or the like will next be described with reference to a flowchart of FIG. 8.

At a step S1, the data transmitting apparatus 10 is in a standby state for a data requesting packet transmitted from the terminal apparatus 20, in which packet a profile, or information indicating capability of the terminal apparatus 20 is described.

When the data transmitting apparatus 10 receives a data requesting packet transmitted from the terminal apparatus 20, the data transmitting apparatus 10 advances the process to a step S2. When the data transmitting apparatus 10 does not receive any data requesting packet, the data transmitting apparatus 10 continues to be in the standby state.

At a step S2, the data transmitting apparatus 10 reads the profile of the terminal apparatus 20 described in a predetermined part of the data requesting packet transmitted from the terminal apparatus 20. When the data transmitting apparatus 10 has read the profile, the data transmitting apparatus 10 advances the process to a step S4. When the data transmitting apparatus 10 cannot read the profile, the data transmitting apparatus 10 advances the process to a step S3.

At the step S3, in response to the fact that the data transmitting apparatus 10 cannot read the profile described in the data requesting packet, the data transmitting apparatus 10 transmits an error message notifying the fact via the network to the terminal apparatus 20 is the source of a transmission of the data requesting packet. After the transmission of the error message, the process returns to the step S1.

At the step S4, the data transmitting apparatus 10 receives a notification of a state of congestion of the network and the like from the network monitoring apparatus, which is not shown in the figure, connected to the network.

At a step S5, the data transmitting apparatus 10 determines on the basis of the profile read from the data requesting packet at the step S2 whether a bandwidth of the network sufficient to transmit image data corresponding to the capability of the terminal apparatus 20 can be used. When the bandwidth cannot be used, the data transmitting apparatus 10 advances the process to a step S6. When the bandwidth can be used, the data transmitting apparatus 10 advances the process to a step S7.

At the step S6, in response to the fact that the bandwidth of the network required to transmit the desired image data is not available, the data transmitting apparatus 10 transmits a message notifying the fact to the terminal apparatus 20 via the network.

At the step S7, the data transmitting apparatus 10 determines for example a hierarchy, resolution, image quality, frame rate and the like of the image data to be transmitted, on the basis of the profile read from the data requesting packet at the step S2 and the state of congestion of the network and the like received at the step S4.

At a step S8, the data transmitting apparatus 10 transmits the image data of the characteristics determined at the step S7 via the network to the terminal apparatus 20 that transmitted the data requesting packet.

At a step S9, the data transmitting apparatus 10 determines whether the transmission of the image data is completed. When the transmission of the image data is completed, the process is ended.

When a request to end the data transmission is transmitted from the terminal apparatus 20 via the network at a step S10, the data transmitting apparatus 10 immediately ends the transmission of the image data.

Thus, the data transmitting apparatus 10 determines the characteristics of the image data to be transmitted, on the basis of the profile described in the data requesting packet transmitted from the terminal apparatus 20 via the network, which profile is the information indicating the capability of the terminal apparatus 20, and a result of monitoring of the network and the like by the network monitoring apparatus.

The data transmitting apparatus 10 then transmits the image data to the terminal apparatus 20.

While a preferred embodiment of the invention has been described using specific terms, such description is for illustrative purposes only, and it is to be understood that changes and variations may be made without departing from the spirit or scope of the following claims.

What is claimed is:

1. A terminal apparatus connected to a data transmitting apparatus for transmitting data via a network, the terminal apparatus comprising:
   packet transmitting means for transmitting a data requesting packet requesting transmission of desired data and including information indicating a capability of the terminal apparatus;
   data receiving means for receiving the desired data that is transmitted from the data transmitting apparatus in response to reception of the data requesting packet;
   decoding processing means for decoding the data received by the data receiving means; and
   output means for outputting the data decoded by the decoding processing means,
   wherein:
      the information indicating the capability of the terminal apparatus includes layered information, a bit rate, a frame rate, a coding/decoding method, processing capability information, color depth information, and a type of allowed traffic for the desired data, the type of allowed traffic indicating an amount of acceptable delay in receiving the data, and
      the data is received in a format that is determined based on the capability information and a congestion of the network, wherein when the network congestion exceeds an amount that allows transmission of data according to the capability information, the format of the data is changed to allow the transmission of the data according to the network congestion.

2. A terminal apparatus as claimed in claim 1, wherein the data transmitted from the data transmitting apparatus is hierarchically coded.

3. A terminal apparatus as claimed in claim 1, wherein the data requesting packet is an IP (Internet Protocol) packet.

4. A terminal apparatus as claimed in claim 3,
   wherein the information indicating the capability of the terminal apparatus is described in header information of the IP packet.

5. A terminal apparatus as claimed in claim 3, wherein the IP packet is a packet defined by IPv4 (Internet Protocol version 4).

6. A terminal apparatus as claimed in claim 3,
   wherein the IP packet is packet defined by IPv6 (Internet Protocol version 6).

7. A terminal apparatus as claimed in claim 1,
   wherein the data received by the data receiving means is image data.

8. A data transmitting apparatus connected to a terminal apparatus via a network, the data transmitting apparatus comprising:
   packet receiving means for receiving a data requesting packet requesting transmission of data, the data requesting packet being transmitted from the terminal apparatus;
   detecting means for detecting information indicating a capability of the terminal apparatus, the information being included in the data requesting packet received by the packet receiving means;

network state information receiving means for receiving information on a state of network congestion, the information being transmitted from a network monitoring apparatus for monitoring the state of network congestion; and data transmitting means for transmitting, via the network, data based on the information indicating the capability of the terminal apparatus detected by the detecting means and the information on the state of network congestion received by the network state information receiving means, wherein:

the information indicating the capability of the terminal apparatus includes layered information, a bit rate, a frame rate, a coding/decoding method, processing capability information, color depth information, and a type of allowed traffic for the data, the type of allowed traffic indicating an amount of acceptable delay in receiving the data, and when the state of network congestion exceeds an amount that allows transmission of data according to the capability information, the format of the data is changed to allow the transmission of the data according to the network congestion.

9. A data transmitting apparatus as claimed in claim 8, wherein the data transmitted to the terminal apparatus is hierarchically coded.

10. A data transmitting apparatus as claimed in claim 8, wherein the data requesting packet is an IP (Internet Protocol) packet.

11. A data transmitting apparatus as claimed in claim 10, wherein the information indicating the capability of the terminal apparatus is described in header information of the IP packet.

12. A data transmitting apparatus as claimed in claim 10, wherein the IP packet is a packet defined by IPv4 (Internet Protocol version 4).

13. A data transmitting apparatus as claimed in claim 10, wherein the IP packet is a packet defined by IPv6 (Internet Protocol version 6).

14. A data transmitting apparatus as claimed in claim 8, wherein the data transmitted to the terminal apparatus is image data.

15. A data transmitting and receiving system comprising:
a terminal apparatus;
a data transmitting apparatus; and
a network monitoring apparatus for monitoring a state of network congestion, the terminal apparatus, the data transmitting apparatus, and the network monitoring apparatus being connected to each other via the network;
wherein the terminal apparatus includes:
  packet transmitting means for transmitting a data requesting packet requesting transmission of desired data and including information indicating a capability of the terminal apparatus;
  data receiving means for receiving the desired data that is transmitted from the data transmitting apparatus in response to reception of the data requesting packet;
  decoding processing means for decoding the data received by the data receiving means; and
  output means for outputting the data decoded by the decoding processing means; and
wherein the data transmitting apparatus includes:
  packet receiving means for receiving the data requesting packet having the information indicating the capability of the terminal apparatus, the data requesting packet being transmitted from the terminal apparatus;
  detecting means for detecting the information indicating the capability of the terminal apparatus from the data requesting packet received by the packet receiving means;
  network state information receiving means for receiving information on the state of network congestion, the information being transmitted from the network monitoring apparatus; and
  data transmitting means for transmitting, via the network, data based on the information indicating the capability of the terminal apparatus detected by the detecting means and the information on the state of network congestion,
  wherein:
    the information indicating the capability of the terminal apparatus includes layered information, a bit rate, a frame rate, a coding/decoding method, processing capability information, color depth information, and a type of allowed traffic for the data, the type of allowed traffic indicating an amount of acceptable delay in receiving the data, and
    when the state of network congestion exceeds an amount that allows transmission of the data according to the capability information, the format of the data is changed to allow the transmission of the data according to the network congestion.

16. A data transmitting and receiving system as claimed in claim 15, wherein the data transmitted from the data transmitting apparatus to the terminal apparatus is hierarchically coded.

17. A data transmitting and receiving system as claimed in claim 15, wherein the data requesting packet is an IP (Internet Protocol) packet.

18. A data transmitting and receiving system as claimed in claim 17, wherein the information indicating the capability of the terminal apparatus is described in header information of the IP packet.

19. A data transmitting and receiving system as claimed in claim 17, wherein the IP packet is a packet defined by IPv4 (Internet Protocol version 4).

20. A data transmitting and receiving system as claimed in claim 17, wherein the IP packet is a packet defined by IPv6 (Internet Protocol version 6).

21. A data transmitting and receiving system as claimed in claim 15, wherein the data transmitted from the data transmitting means of the data transmitting apparatus and received by the data receiving means of the terminal apparatus is image data.

22. A data transmitting and receiving method of a data transmitting and receiving system, the data transmitting and receiving system including: a terminal apparatus; a data transmitting apparatus; and a network monitoring apparatus for monitoring a state of network congestion, the terminal apparatus, the data transmitting apparatus, and the network monitoring apparatus being connected to each other via the network, the data transmitting and receiving method comprising:
the terminal apparatus transmitting a data requesting packet requesting transmission of desired data and including information indicating a capability of the terminal apparatus;

the data transmitting apparatus receiving the data requesting packet transmitted from the terminal apparatus;

detecting the information indicating the capability of the terminal apparatus from the data requesting packet received;

receiving information on the state of network congestion, the information being transmitted from the network monitoring apparatus; and transmitting data based on the detected information indicating the capability of the terminal apparatus and the received information on the state of network congestion to the terminal apparatus via the network; and the terminal apparatus receiving the desired data transmitted from the data transmitting apparatus;

decoding the received data; and outputting the decoded data, wherein:

the information indicating the capability of the terminal apparatus includes layered information, a bit rate, a frame rate, a coding/decoding method, processing capability information, color depth information, and a type of allowed traffic for the data, the type of allowed traffic indicating an amount of acceptable delay in receiving the data, and when the state of network congestion exceeds an amount that allows transmission of data according to the capability information, the format of the data is chanced to allow the transmission of the data according to the network congestion.

* * * * *

UNITED STATES PATENT AND TRADEMARK OFFICE
CERTIFICATE OF CORRECTION

PATENT NO. : 7,573,877 B2  Page 1 of 1
APPLICATION NO. : 10/414947
DATED : August 11, 2009
INVENTOR(S) : Eisaburo Itakura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1830 days.

Signed and Sealed this

Seventh Day of September, 2010

David J. Kappos
*Director of the United States Patent and Trademark Office*